March 5, 1957  G. A. PHILBRICK  2,783,769
COMBINED BALANCED PRESSURE REGUALTOR AND RELIEF VALVE
Original Filed Aug. 12, 1949  2 Sheets-Sheet 1
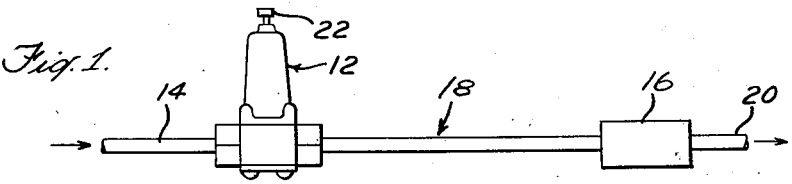
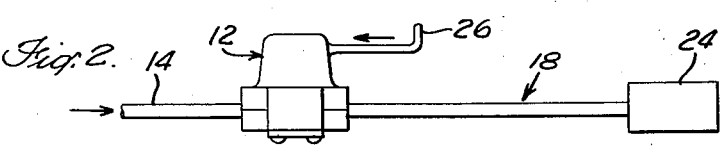
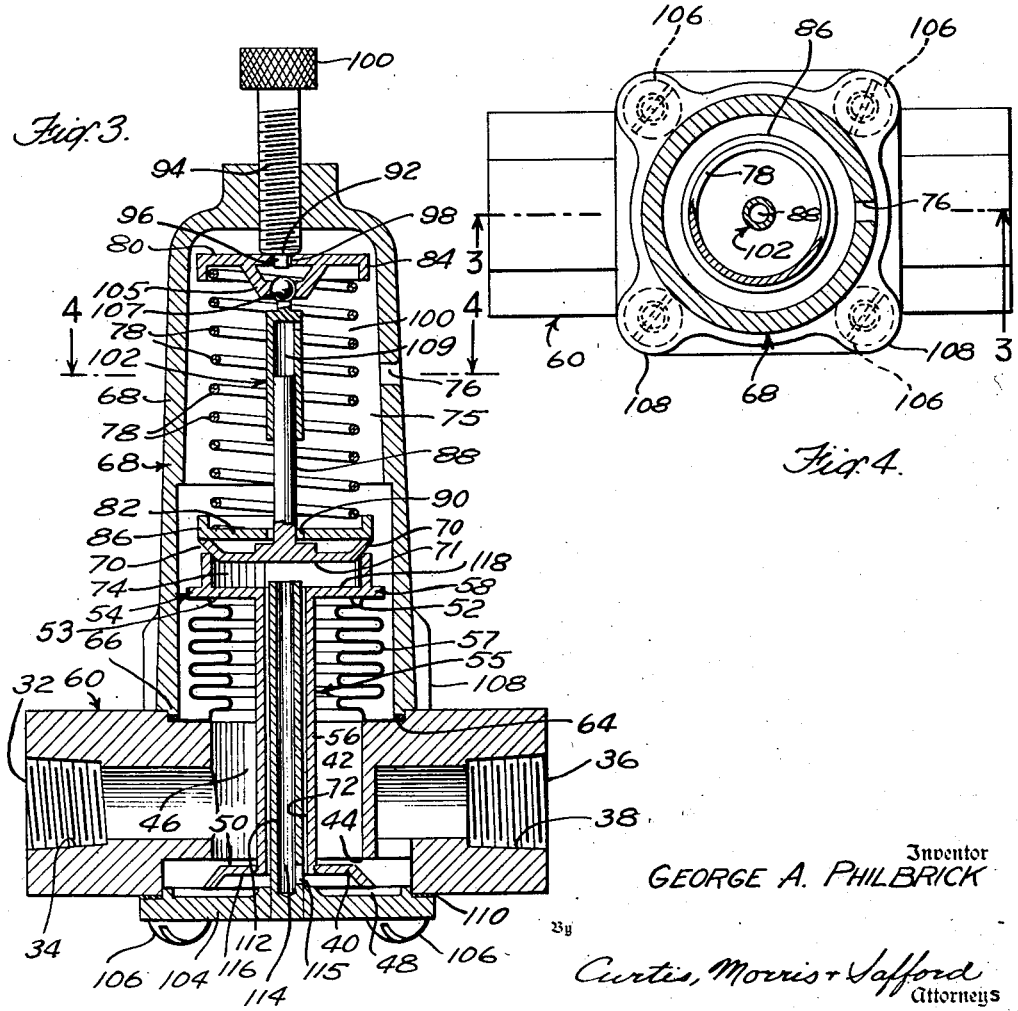
Inventor
GEORGE A. PHILBRICK
By Curtis, Morris + Safford
Attorneys

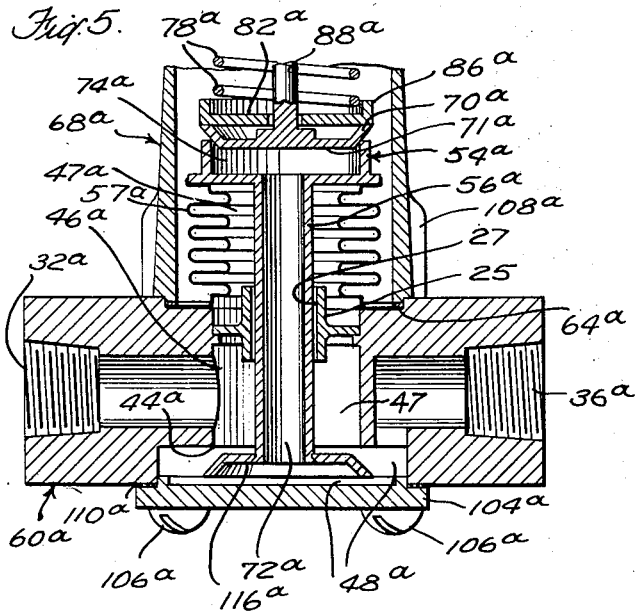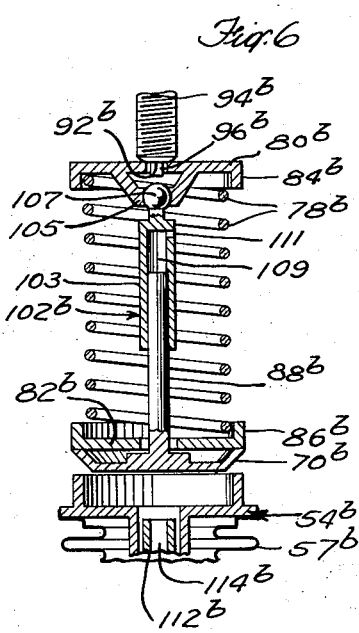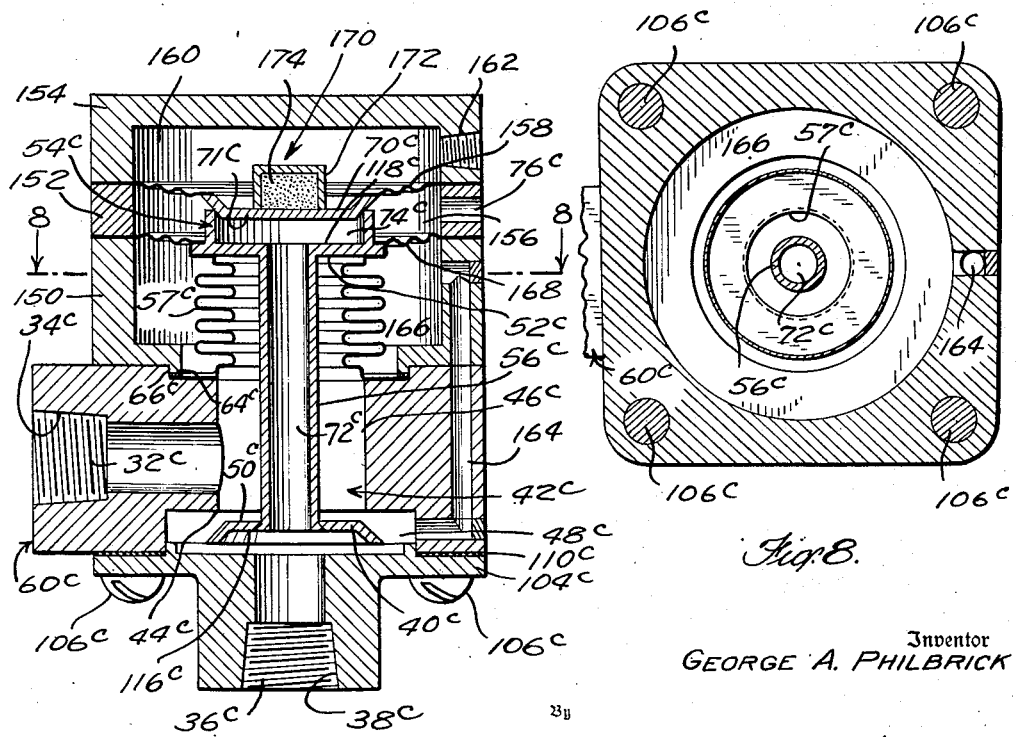

United States Patent Office 2,783,769
Patented Mar. 5, 1957

2,783,769

COMBINED BALANCED PRESSURE REGULATOR AND RELIEF VALVE

George A. Philbrick, Cambridge, Mass.

Continuation of application Serial No. 109,859, August 12, 1949. This application March 18, 1953, Serial No. 343,012

27 Claims. (Cl. 137—116.5)

This invention relates to fluid pressure regulating valves for converting intake fluid pressures into controlled output pressures, and more particularly to balanced valves of this type for reducing higher intake fluid pressures to any desired controlled lower output fluid pressures.

Conventional pressure regulating valves have certain limitations. Some have "stem reaction," i. e. they may evidence variations in the controlled output pressure as a result of variations in the intake pressure, and others, when constructed to eliminate stem reaction, are complicated and expensive. Some conventional valves have relatively small intake and exhaust or bleeding capacity which makes them unsatisfactory for many "dead-end" and similar applications; while others are unstable, i. e. vibrate or hum, when controlling pressures to loads calling for a continuous flow of fluid.

Regulating and relief valves heretofore constructed to overcome these disadvantages have undesirably complicated mechanisms, or are subject to clogging because of fixed restrictions in the flow path, or wastefully bleed large quantities of fluid.

An object of this invention is to provide a balanced pressure regulating and relief valve of relatively simple, inexpensive construction and of large flow capacity, and one in which stem reaction is negligible. A further object is to provide such a device which is stable, and one which can be operated either with a dead-end load with large transitory flows or to pass considerable continuous flow. These and other objects and advantages will in part be pointed out and will in part become apparent from the following description taken in conjunction with the annexed drawings.

The present invention is illustrated as embodied in a pneumatic-type regulating valve but it is apparent that it is useful in controlling the flow of many other fluids.

Figure 1 illustrates the use of a pressure regulating and relief valve to supply a continuous flow of air at regulated pressure to a pneumatic load system;

Figure 2 illustrates the use of a regulating and relief valve to supply a regulated dead-end pressure to a pneumatic load system not requiring a continuous flow of air, i. e. as to a closed tank;

Figure 3 is an axial sectional view of a pressure regulating valve embodying the present invention;

Figure 4 is a horizontal section taken along the line 4—4 in Figure 3;

Figure 5 is a partial axial sectional view of a valve incorporating another embodiment of this invention;

Figure 6 is a partial view of the valve of Figure 3, separately shown for purposes of convenience in explanation;

Figure 7 is an axial sectional view of another embodiment of this invention showing how it may be used in a relay valve; and Figure 8 is a horizontal sectional view of Figure 7 taken along line 8—8 in Figure 7.

Referring to Figure 1, a pressure regulating and relief valve, embodying the invention is generally indicated at 12. Air under high intake pressure is supplied to regulating and relief valve 12 through intake pipe 14, and valve 12 continuously passes the quantity of air required by a pneumatic load system 16 while at the same time reducing the pressure thereof from the higher intake pressure to the desired regulated output pressure required by pneumatic load 16. The required air at regulated pressure flows from regulating valve 12 through output pipe 18 to pneumatic load 16 which uses this air and finally exhausts it to atmosphere by an open pipe 20. Regulating valve 12 carries a control knob 22 by which it is possible to set the valve 12 to deliver the desired output pressure to line 18.

Figure 2 illustrates a similar arrangement to Figure 1 except that pneumatic load 24 is a dead-end load, that is, it has no exhaust opening such as open pipe 20 on load 16 as shown in Figure 1. Also regulating valve 12 in Figure 2 is designed as a relay, that is, it delivers its controlled output through pipe 18 at a pressure which is regulated in accordance with a bias pressure existing in a line 26; whereas, in Figure 1, the output pressure of valve 12 is regulated in accordance with the position of the knob 22. Since dead-end load 24 does not require a continuous passage of air, there is no continuous flow of air through regulating valve 12.

Referring to Figures 3 and 4, the regulating valve shown therein receives a supply of air at input pressure into intake port 32, threaded at 34 to receive an intake pipe, and the valve delivers the desired output flow of air at a lower and regulated pressure from output port 36, threaded at 38 to receive an output pipe. In order to regulate this output pressure, a valve body or plug 40 is positioned in a chamber 42 connecting intake port 32 and output port 36. This valve plug 40 cooperates with a stationary valve seat 44, serving to divide the chamber 42 into an intake pressure chamber 46 and an output pressure chamber 48, to regulate the pressure in output pressure chamber 48 and, hence, in any pneumatic load system connected thereto.

In order to counterbalance the thrust of the air pressure in intake chamber 46 against the upper (as shown in the drawing) surface 50 of valve plug 40, a surface 52, of the same effective area as surface 50 is provided on a closure member 53 mechanically connected to valve plug 40 by a tubular element 56 extending across intake chamber 46 and forming with valve plug 40 and closure member 53 a unitary valve stem structure, indicated generally at 55. Since these surfaces 50 and 52 are of equal effective area, the thrust of the intake pressure against surface 52 on movable closure member 53 is equal and opposite to the thrust against the surface 50 of plug 40, and these thrusts counterbalance each other. Thus, plug 40 is free from any resultant force caused by the intake pressure.

A flexible bellows 57 is secured to the flange 58, surrounding the surface 52 of closure member 53. This bellows 57 limits the vertical application of the intake pressure within chamber 46 to surfaces 50 and 52, and it extends from flange 58 to frame 60 where a bottom flange on the bellows 57 is clamped against frame 60 by an annular sealing gasket 64 which is held in place by an annular tongue 66 on a bonnet 68. This bellows 57 serves to apply the intake pressure to surface 52, and at the same time confines the intake pressure within chamber 46. The bellows 57 is sufficiently flexible to allow valve plug 40 to move to and from its stationary seat 44.

In order that the belows 57 exert a minimum of axial compression during operation, the bellows 57 is designed to be in a relaxed state i. e. at its unstressed length, when valve plug 40 is seated against its seat 44. As plug 40 moves progressively downward (as shown in the drawing) away from the seat 44, the bellows 57 is subjected to a progressively increasing compressive force.

To counterbalance the thrust of the air pressure in output chamber 48 against the lower surface 116 of valve plug 40, a surface 118 of the same effective area as surface 116 is provided on closure member 53. Since these surfaces 116 and 118 are of equal effective area, the opposing thrusts against these surfaces, caused by the output pressure, counterbalance. Thus, unitary valve stem structure 55 and plug 40 are free from any resultant force caused directly by the output pressure. And as already seen, unitary structure 55 and plug 40 are free from any resultant force caused by the intake pressure. Consequently structure 55 and plug 40 are subject only to the compressive force of bellows 57 and to the force of an exhaust plug 70 biased to push against the valve seat 54 formed onto closure member 53.

At times during the operation of this valve it is necessary, depending upon changing load or upon manual resetting of the controlled output pressure, to reduce the pressure in output chamber 48. To accomplish this, air from the output pressure chamber 48 is conveyed to an interior 74 of valve seat 54 and closure member 53 by means of a passage 72 extending through tubular element 56 from output chamber 48 to the interior 74. When exhaust plug 70 separates from seat 54, the output pressure escapes into an interior 75 of the bonnet 68 and thence through an exhaust port 76 to atmosphere.

In order to regulate the output pressure and to bias the exhaust plug 70 against seat 54, a compression spring 78 is inserted between adjustable retaining cup 80 and movable retaining cup 82. Spring 78 is retained concentrically on cup 80 by a retaining rim 84, and is retained on cup 82 by a retaining rim 86. Cup 82 bears against the exhaust plug 70, which in turn is thus biased to seat upon movable seat 54. The exhaust plug 70 has a pin 88 which projects loosely through hole 90 in retaining cup 82. This pin 88 serves to prevent the plug 70 from sliding out of relationship with the cup 82, and the play between the pin 88 and the hole 90 allows the plug 70 to seat itself properly upon the seat 54, independently of the relative lateral position of cup 82 and seat 54. The adjustable retaining cup 80 thrusts against the shoulder 92 of adjusting screw 94, and it is centered on screw 94 by a pin 96 which projects from the end of screw 94 loosely through the hole 98 in cup 80. The screw 94 is threaded through the bonnet 68 and has a knurled knob 100 to enable manual adjustment of the amount of compression in spring 78, and thus to enable adjustment of the output pressure as hereinafter will be explained. Included between cups 80 and 82 is a damping mechanism indicated generally at 102. This damping mechanism is explained later by a description made in conjunction with Figure 6 of the drawings.

Closing the bottom of the output pressure chamber 48 (Figure 3) is a cover plate 104, which is connected to the frame 60 and bonnet 68 by bolts 106, screwing into four brackets 108 on the bonnet 68. Clamped between the cover plate 104 and the frame 60 is a sealing gasket 110 serving to seal the output chamber 48.

As explained above, valve plug 40, movable element 56, and movable valve seat 54 move as a unitary valve stem structure 55, and in order to guide the motion of this unitary structure 55, a guide rod 112 may be provided. Guide rod 112 is mounted on the cover plate 104 and extends loosely into a passage 72 running through the element 56. This rod 112 may have an axial passage 114 to insure the unobstructed passage of air from the output chamber 48 to the interior 74 of valve seat 54. This passage is connected to output chamber 48 by a lateral hole 115; this passage 114 supplements passage 72 in admitting air from output chamber 48 to the interior 74 of seat 54.

The operation of this reducing valve can be explained by assuming sets of operating conditions and following changes in the relative positions of different parts of the valve resulting from changes in these conditions. Assuming the valve to be supplied with air at some intake pressure of, say 50 pounds per square inch gauge in the intake chamber 46, and assuming that the screw 94 is turned to a position to produce no compression in spring 78, then plug 70 exerts no force against seat 54, and the bellows 57 is under no compression force and holds plug 40 so as to be seated lightly against stationary seat 44. Under these conditions none of the air at intake pressure can flow past plug 40 into the output chamber 48, and any air in excess of atmospheric pressure which may previously have existed in output chamber 48 is allowed to escape past exhaust valve plug 70 to the atmosphere to bring the output pressure down to atmospheric pressure or, in other words, to zero gauge pressure.

Now assuming that the screw 94 is turned down to a position corresponding to, say, 30 p. s. i. gauge output pressure, the spring 78 and bellows 57 are placed under compressive force, and valve plug 70 seats firmly against seat 54 while plug 40 is moved away from seat 44 allowing air under pressure to flow from the intake chamber 46 to the output chamber 48. The pressure rapidly begins to build up in the output chamber 48, and at the same time the force against the surface 71 of plug 70 begins to increase, causing spring 78 to compress further, and causing plug 70 to move upward. Bellows 57, which is under compression causes movable seat 54 also to move upward, following the plug 70; so valve plug 40 begins to move toward its seat 44. This process, i. e. the increasing pressure in output chamber 48 causing an increasing force against surface 71 causing plug 40 to move toward its seat 44 continues until a short time the output pressure has built up to the desired 30 p. s. i. gauge. Then the force against surface 71 is just sufficient to hold valve plug 40 in an equilibrium position. In a dead-end application as shown in Figure 2 this equilibrium position is obtained when plug 40 is seated against seat 44. However, in an open-ended application as shown in Figure 1, there would be a continued flow from intake chamber 46 to output chamber 48, and plug 40 would reach an equilibrium position a slight distance from seat 44.

If after the output pressure has reached equilibrium at 30 p. s. i. gauge, there is a manual adjustment made to increase the controlled pressure to, say, 40 p. s. i. gauge by turning screw 94 further down, the plug 40 is moved further from seat 44, and an increased flow of air into output chamber 48 results. Very shortly the pressure in output chamber 48 is built up to 40 p. s. i. gauge, causing an increased pressure against surface 71, resulting in a new equilibrium position for valve plug 40.

If, on the other hand, when the output pressure is at 30 p. s. i. gauge, there is an adjustment made to decrease the pressure to, say, 20 p. s. i. gauge, then screw 94 is moved upward, reducing the compressive force on spring 78 and allowing the force of the output pressure against surface 71 to move exhaust plug 70 upward. This upward motion of plug 70 allows the bellows 57 to seat valve plug 40 against seat 44, shutting off the flow of air from the intake chamber 46. The upward motion of exhaust plug 70 continues, and plug 70 leaves its seat 54 and acting as an exhaust or bleeding port allows the output air pressure to escape from output chamber 48 until the output pressure is down to the control value of 20 p. s. i. gauge. It may be noted that this exhaust valve plug 70 has as large a diameter as the main valve plug 40; so this pressure regulating and relief valve has as great an exhausting capacity as it does main flow capacity which is an important consideration in any applications where there are likely to be fluctuations in load calling for sudden bleeding or relief of the controlled pressure. Also it may be noted that this exhaust action cannot occur until the flow from the intake chamber 46 is shut off because exhaust valve plug 70 does not leave its seat 54 until valve plug 40 is seated against seat 44. This sequence is important because there occurs no wasteful exhausting directly from the intake pressure chamber 46.

In Figure 5 of the drawings there is shown a partial elevational cross-sectional view of another embodiment of this invention. Parts of the valve in Figure 5 similar to parts in Figures 3 and 4 are indicated by corresponding numbers followed by the small letter "a." The embodiment of this invention shown in Figure 5 is similar to Figures 3 and 4 except that, in order to produce an additional damping or dashpot action upon movable element 56a, an annular baffle 25 has been placed around element 56a in intake chamber 46a. The baffle 25 divides the intake chamber 46a into a lower chamber reservoir 47 and an upper chamber reservoir 47a.

Damping or dashpot action may be necessary in commercially mass-produced valves of this type because the slight imperfections of mass production have a tendency to cause instability in the positioning of valve plug 40a. It has been found that the addition of baffle 25 overcomes any instability in the positioning of valve plug 40a. In this figure of the drawings, the guide rod 112 (shown in Figure 3) is omitted. It will of course be recognized that the upper damping device of the Figure 3 embodiment can be omitted from the device of Figure 5, if desired, and the annular baffle 25 used as the sole damping means.

In Figure 6 is shown for convenience, a partial elevational cross sectional view of the embodiment of this invention shown in Figures 3 and 4. Parts of the valve in Figure 6 similar to parts in Figures 3 and 4 are indicated by corresponding numbers followed by the small letter "b." In this embodiment, in order to damp the motion of valve plug 70b, a damping mechanism 102b may be placed between adjustable retaining cup 80b and valve plug 70b. This damping mechanism 102b differs from the baffle 25 shown in Figure 5 in that damping mechanism 102b operates when the valve is either in the supplying or exhausting position, whereas baffle 25 (Figure 5) has no effect on valve plug 70a when plug 70a is separated from seat 54a in the exhausting position. Damping mechanism 102b comprises a cylinder 103 into which slides pin piston 88b. Cylinder 103 is swivally attached to braces 105 by a ball and socket joint 107, and braces 105 are affixed to a retaining cup 80b. Any relative motion between pin 88b and cylinder 103 results in a change in the volume of cylindrical chamber 109 and consequently air must pass through damping port 111 which extends from the chamber 109 to the exterior of cylinder 103. Damping port 111 has a resistive effect upon the air flow and tends to damp any vibratory motion of valve plug 70b.

In Figures 7 and 8 are shown an axial and sectional view respectively of still another valve embodying this invention. Parts of the valve in Figures 7 and 8 which are corresponding to and perform similar functions to parts of the valve in Figures 3 and 4 are indicated by corresponding numbers followed by a small letter "c." The valve receives a supply of air at intake pressure into intake port 32c which has threads 34c to receive an intake pipe, and the valve delivers the desired flow of air at regulated pressure from output port 36c which has threads 38c to to receive an output pipe. In order to regulate the output pressure, a valve plug 40c is placed in chamber 48c connecting intake port 32c and output port 36c. This valve plug 40c cooperates with valve seat 44c serving to divide chamber 42c into an intake pressure chamber 46c and an output pressure chamber 48c. Plug 40c cooperating with valve seat 44c serves to regulate the pressure in output chamber 48c and hence in any load system connected thereto. In this arrangement the thrust of the intake air pressure against the surface 50c of valve plug 40c is counterbalanced by the thrust against a surface 52c (circumscribed by a flexible bellows 57c) of the same effective area as surface 50c which is provided on movable valve seat 54c. Movable valve seat 54c is mechanically connected to valve plug 40c by a tubular element 56c. To apply the intake pressure to surfaces 52c, the flexible bellows 57c is secured to movable valve seat 54c; and the other end of the bellows is clamped against frame 60c by an annular gasket 64c which is held in place by an annular projection 66c on a lower bonnet segment 150. Bellows 57c is designed to be in an unstressed state when valve plug 40c is seated against seat 44c.

In order to exhaust the output pressure to atmosphere, an exhaust valve plug 70c is provided to cooperate with the seat 54c. The passage 72c conveys the output pressure to exhaust plug 70c; and when plug 72c leaves seat 54c, the output pressure escapes into the interior 156 of an upper bonnet segment 152 and thence to atmosphere through an exhaust port 76c. Secured to valve plug 70c is a damping device indicated generally at 170. This damping device 170 may consist of a container 172 partially or loosely filled with very finely divided dry particles 174 of some material such as tungsten.

A flexible seal 158 is fastened to plug 70c and extends out to an upper bonnet segment 152 where the seal 158 is clamped between a bonnet cap 154 and the upper segment 152. A controlling or regulating fluid pressure is admitted to a bonnet cap chamber 160 through a control port 162. This regulating fluid pressure acts against the surface of valve plug 70c and also against the seal 158 to bias the exhaust plug 70c and hence to control the output pressure from the valve.

To provide an increased sensitivity of control of the output pressure, the output pressure is admitted through passage 164 to chamber 166 where it acts against the underside of an annular flexible seal 168. This seal 168 is fastened to the valve seat 54c and extends out to the lower bonnet segment 150 where it is clamped between the lower segment 150 and the upper segment 152. When the valve is in the output position with exhaust plug 70c seated against movable seat 54c, the output pressure thrusts against the underside of seal 168 as shown in the drawing and also thrusts against surface 71c of valve plug 70c. Thus the seal 168 may be considered as increasing the effective diameter of valve plug 70c in the output condition. Thus any given incremental change in the output pressure works against a larger effective area and hence creates a larger change in force tending to re-position main plug 70c so as to re-secure the desired output pressure; so the valve is more sensitive in maintaining desired output pressure.

The output pressure chamber 48c is closed by a cover plate 104c, which is connected to the frame 60c by bolts 106c which screw into bonnet cap 154, to hold the valve structure together.

The operation of the embodiment of this invention shown in Figures 7 and 8 is similar to the operation of the embodiment shown in Figures 3 and 4 with the exception that, although the effective area of valve plug 70c is increased in the output position, it presents only its actual area when the valve is in the exhausting condition; and so the controlled pressure is higher under exhausting conditions than under output conditions. However, by increasing the actual effective area 71c of valve plug 70c by an amount equal to the total effective area of annular flexible seal 168, the benefit of increased sensitivity is obtained in both the supply and exhaust conditions, and the pressure in the exhaust condition becomes the same as in the output condition.

While but a few embodiments of my invention have been shown and described, it is to be understood that it is capable of many modifications; changes, therefore, in the construction and arrangement may be made which do not depart from the spirit and scope of the invention as disclosed in the appended claims.

This application is a continuation of U. S. application

Serial No. 109,859, filed August 12, 1949, by George A. Philbrick and now entitled Combined Balanced Pressure Regulator and Relief Valve.

I claim:

1. A pressure regulating and relief valve for converting an intake fluid pressure into a regulated output pressure, comprising, in combination, a casing having intake and output ports connected internally by a chamber, a stationary valve seat dividing said chamber into an intake pressure chamber and an output pressure chamber, a movable element having two ends, one of which comprises a movable valve plug and the other of which comprises a movable valve seat, said movable valve plug cooperating with said stationary valve seat to control the flow of fluid past said seat, a seal extending between said movable valve seat and said casing and sealing said intake pressure chamber, said movable element having a passage therethrough from said movable valve plug to said movable valve seat, and a second movable valve plug biased to move toward the movable valve seat to regulate therewith the bleeding of pressure fluid from said passage.

2. A pressure regulating and relief valve for converting an intake fluid pressure into a regulated output pressure, comprising, in combination, a casing having intake and output ports connected internally by a chamber, a stationary valve seat dividing said chamber into an intake pressure chamber and an output pressure chamber, a movable element having two ends, one of which comprises a movable valve plug and the other of which comprises a movable valve seat, said movable valve plug cooperating with said stationary valve seat to control the flow of fluid past said seat from said intake pressure chamber to said output pressure chamber, a seal extending between said movable valve seat and said casing and sealing said intake pressure chamber, said movable valve seat and said movable valve plug having surfaces of equal effective area exposed to the intake pressure whereby the operation of the valve is substantially unaffected by variations in the intake pressure, means conveying fluid pressure from the output chamber to said movable valve seat, and a second movable valve plug biased to move toward the movable valve seat to regulate therewith the bleeding of pressure fluid from said output pressure chamber.

3. A pressure regulating and relief valve for converting an intake fluid pressure into a regulated output pressure, comprising, in combination, a casing having intake and output ports connected internally by a chamber, a stationary valve seat dividing said chamber into an intake pressure chamber and an output pressure chamber, a movable element having two ends, one of which comprises a movable valve plug and the other of which comprises a movable valve seat, said movable valve plug cooperating with said stationary valve seat to control the flow of fluid past said seat, a seal extending between said movable valve seat and said casing and sealing said intake pressure chamber, said movable valve seat and said movable valve plug having surfaces of equal effective area exposed to the intake pressure whereby the operation of the valve is substantially unaffected by variations in the intake pressure, said movable element having a passage therethrough from said movable valve plug to said movable valve seat, and a second movable valve plug biased to move toward the movable valve seat to regulate therewith the bleeding of pressure fluid from said passage.

4. A pressure regulating and relief valve for converting an intake fluid pressure into a regulated output pressure, comprising, in combination, a casing having intake and output ports connected internally by a chamber, a stationary valve seat, a movable element having two ends, one of which comprises a movable valve plug and the other of which comprises a movable valve seat, said movable valve plug cooperating with said stationary valve seat to control the flow of fluid past said seat, a flexible seal between said casing and said movable valve seat, whereby said intake pressure fluid is applied to the surfaces of said movable valve plug and said movable valve seat, said surfaces being of equal effective area so that said intake pressure exerts no resultant force component on said movable element to move it within said chamber, a passage extending through said movable element from said movable valve plug to said movable valve seat, and a second movable valve plug biased to move toward the movable valve seat to regulate therewith the bleeding of pressure fluid from said passage.

5. A pressure regulating and relief valve for converting an intake fluid pressure into a regulated output pressure, comprising, in combination, a casing having intake and output ports connected internally by a chamber, a stationary valve seat dividing said chamber into an intake pressure chamber and an output pressure chamber, a movable element having two ends, one of which comprises a movable valve plug and the other of which comprises a movable valve seat, said movable valve plug cooperating with said stationary valve seat to control the flow of fluid past said seat, a seal extending between said movable valve seat and said casing and sealing said intake pressure chamber, said movable element having a passage therethrough from said movable valve plug to said movable valve seat, a second movable valve plug biased to move toward the movable valve seat to regulate therewith the bleeding of pressure fluid from said passage, and a rigid member extending into said passage to guide the motion of said movable element.

6. A pressure regulating and relief valve for converting an intake fluid pressure into a regulated output pressure, comprising, in combination, a casing having intake and output ports connected internally by a chamber, a stationary valve seat dividing said chamber into an intake pressure chamber and an output pressure chamber, a movable element having two ends, one of which comprises a movable valve plug and the other of which comprises a movable valve seat, said movable valve plug cooperating with said stationary valve seat to control the flow of fluid past said seat, a seal extending between said movable valve seat and said casing and sealing said intake pressure chamber, an annular baffle affixed to said casing and closely surrounding the movable element, said movable element having a passage therethrough from said movable valve plug to said movable valve seat, and a second movable valve plug biased to move toward the movable valve seat to regulate therewith the bleeding of pressure fluid from said passage.

7. A pressure regulating and relief valve for converting an intake fluid pressure into a regulated output pressure, comprising, in combination, a casing having intake and output ports connected internally by a chamber, a stationary valve seat dividing said chamber into an intake pressure chamber and an output pressure chamber, a movable element having two ends, one of which comprises a movable valve plug and the other of which comprises a movable valve seat, said movable valve plug cooperating with said stationary valve seat to control the flow of fluid past said seat, a seal extending between said movable valve seat and said casing and sealing said intake pressure chamber, said movable valve seat and said movable valve plug having surfaces of equal effective area exposed to the intake pressure whereby the operation of the valve is substantially unaffected by variations in the intake pressure, and a second movable valve plug having vibration damping means operatively associated therewith and said second plug biased to move toward the movable valve seat to regulate therewith the bleeding of pressure fluid from said passage.

8. A pressure regulating and relief valve for converting an intake fluid pressure into a regulated output pressure, comprising, in combination, a casing having intake and output ports connected internally by a chamber, a stationary valve seat dividing said chamber into an intake pressure chamber and an output pressure chamber, a movable element having two ends, one of which comprises a movable valve plug and the other of which comprises a movable valve seat, said movable valve plug cooperating with said stationary valve seat to control the flow of fluid to the output pressure chamber from the intake pressure chamber, a seal between said casing and said movable valve seat and sealing said intake pressure chamber, whereby said intake pressure fluid is applied to surfaces of said movable valve plug and said movable valve seat, said surfaces being of equal effective area so that said intake pressure exerts no resultant force component on said movable element to move it within said casing, said movable element having a passage therethrough from said output chamber to said movable valve seat, and a second movable valve plug having vibration damping means operatively associated therewith and being biased to move toward the movable valve seat to regulate therewith the exhausting of pressure fluid from said output pressure chamber.

9. A pressure regulating and relief valve for converting an intake fluid pressure into a regulated output pressure, comprising, in combination, a casing having intake and output ports connected internally by a chamber, a stationary valve seat dividing said chamber into an intake pressure chamber and an output pressure chamber, a movable element having two ends, on of which comprises a movable valve plug and the other of which comprises a movable valve seat, said movable valve plug cooperating with said stationary valve seat to control the flow of fluid from said intake pressure chamber past said seat to said output pressure chamber, a seal extending between said casing and said movable valve seat, whereby said intake pressure fluid is applied to surfaces of said movable valve plug and said movable valve seat, said surfaces being of equal effective area whereby said intake pressure exerts no resultant force component on said movable element to move it within said chamber, said movable element having a passage extending therethrough from said movable valve plug to said movable valve seat, an annular baffle affixed to said casing and closely surrounding said movable element, and a second movable valve plug having vibration damping means operatively associated therewith and being biased to move toward the movable valve seat to regulate therewith the bleeding of pressure fluid from said passage.

10. A pressure regulating and relief valve for converting an intake fluid pressure into a regulated output pressure, comprising, in combination, a casing having intake and output ports connected internally by a chamber, a stationary valve seat dividing said chamber into an intake pressure chamber and an output pressure chamber, a movable element having two ends, one of which comprises a movable valve plug and the other of which comprises a movable valve seat, said movable valve plug cooperating with said stationary valve seat to control the flow of fluid to the output pressure chamber from the intake pressure chamber, said movable element having a passage extending therethrough from said movable valve plug to said movable valve seat, a flexible seal attached to said movable valve seat and to said casing for sealing said intake pressure chamber and for limiting the application of the intake pressure to part of the surface of said movable valve seat, a second flexible seal attached to said movable valve seat and to said casing for increasing the effective area of said movable valve seat, said second seal cooperating with said first seal and casing to define a sealed chamber, said casing having a second passage therein extending between said output pressure chamber and said sealed chamber for conducting said output pressure to said sealed chamber and thus to said second seal, and a second movable valve plug biased to move toward the movable valve seat to control the bleeding of pressure from said first named passage.

11. A pressure regulating and relief valve for converting an intake fluid pressure into a regulated output pressure comprising, in combination, a casing having intake and output ports connected internally by a chamber, a stationary valve seat dividing said chamber into an intake pressure chamber and an output pressure chamber, a movable tubular valve stem having two ends, one of which comprises a movable valve disk and the other of which comprises a cupped movable valve seat, said movable valve disk cooperating with said stationary valve seat to control the flow of fluid to the output pressure chamber from the intake pressure chamber, a flexible bellows connected to the cupped movable valve seat and to the casing and surrounding said tubular valve stem, whereby said intake pressure fluid is applied to confronting surfaces of said movable valve disk and said cupped movable valve seat, said surfaces being of equal effective area so that said intake pressure exerts no resultant force component on said tubular valve stem to move it within said casing, said tubular valve stem having a passage therethrough from said output chamber to said cupped movable valve seat to conduct the output pressure to the interior of said cupped seat, a second movable valve disk cooperating with the cupped movable valve seat and biased to move toward the cupped movable valve seat to regulate therewith the exhausting of pressure fluid from said passage, a spring operatively associated with said second valve disk to bias said second disk toward said cupper movable valve seat, and adjusting means for adjusting the compression in said spring.

12. A pressure regulating and relief valve for controlling the application of a fluid from an intake pressure source to a system to be supplied with said fluid at a controlled output pressure, comprising, a casing having intake and output ports, a chamber connecting these ports, a fixed valve member, a first movable valve element cooperating with said valve member to control the flow of fluid from the intake port to the output port, a surface of said first element being exposed to the intake pressure, a second movable valve element, a surface of said second element opposed to the said surface of said first valve element and being exposed to the intake pressure, a seal between said casing and said second movable valve element limiting the application of the intake pressure to the said surface of said second element, said exposed surfaces being of equal effective area, means connecting said first and second elements whereby the force of the intake pressure on said first element is balanced by the force of the intake pressure on said second element, a passageway extending from the output port to said second element, a third movable valve element cooperating with the second element to control the exhausting of fluid from the output port through said passageway, and adjustable means responsive to the pressure of the fluid in the output port arranged to control the position of said first element.

13. A pressure regulating and relief valve for converting an intake fluid pressure into a controlled output pressure comprising a casing having intake and output ports, a chamber connecting these ports, a fixed valve member in said chamber dividing said chamber into an intake pressure chamber and an output pressure chamber, a movable valve stem, spaced first and a second movable valve elements secured to said stem, said first element cooperating with said stationary valve member to control the flow of fluid from said intake pressure chamber to said output pressure chamber, a seal extending between said casing and the second movable valve element and sealing said intake pressure chamber, said first and second elements having surfaces of equal effective area exposed to the intake pressure, whereby said intake pressure exerts no resultant force component on said movable stem, said movable stem having a passageway extending therethrough from the output pressure side of said first movable valve element to said second movable valve element, and a third movable valve element biased to close against the second movable valve element whereby the bleeding of pressure fluid from said passageway is regulated and whereby the bleeding of fluid directly from the intake chamber is prevented.

14. A pressure regulating and relief valve for converting an intake fluid pressure into a regulated output pressure, comprising a casing having intake, output, and exhaust ports, an intake pressure chamber connected to said intake port and an output pressure chamber connected to said output port, a fixed valve member, a movable valve structure cooperating with said member to control the flow of fluid from the intake chamber to the output chamber, a portion of said movable valve structure defining a first movable valve element, said movable valve structure having opposed surfaces of equal effective area exposed to the intake fluid pressure, whereby the forces of the intake pressure on said movable valve structure are balanced, said movable valve structure having opposed surfaces of equally effective area exposed to the output fluid pressure, whereby the forces of the output pressure on said movable valve structure are balanced, a passageway extending through said structure and said casing past said first movable valve element to said exhaust port, said passageway being in continuous communication with the fluid in the output pressure chamber and a second movable valve element biased to move toward said first movable valve element defined by said valve structure to regulate the bleeding of fluid from said output pressure chamber through said passageway.

15. A pressure regulating and relief valve for controlling the application of a fluid from an intake pressure source to a system to be supplied with said fluid at a controlled output pressure, comprising, a casing having intake and output ports, a chamber connecting these ports, a fixed valve member, a first movable valve element cooperating with said valve member to control the flow of fluid from the intake port to the output port, a surface of said first element being exposed to the intake pressure, a second movable valve element, a surface of said second element opposed to the said surface of said first valve element and being exposed to the intake pressure, a seal between said casing and said second movable valve element limiting the application of the intake pressure to the said surface of said second element, said exposed surfaces being of equal effective area, means connecting said first and second elements whereby the force of the intake pressure on said first element is balanced by the force of the intake pressure on said second element, a passageway extending from the output port to said second element, a third movable valve element cooperating with the second element to control the exhausting of fluid from the output port through said passageway, and adjustable means responsive to the pressure in the output port and arranged to apply a force to at least one of said movable valve elements.

16. A pressure regulating and relief valve for converting an intake fluid pressure into a controlled output pressure comprising a casing having intake and output ports, a chamber connecting these ports, a fixed valve member in said chamber dividing said chamber into an intake pressure chamber and an output pressure chamber, a movable valve stem, spaced first and a second movable valve elements secured to said stem, said first element cooperating with said stationary valve member to control the flow of fluid from said intake pressure chamber to said output pressure chamber, a seal extending between said casing and the second movable valve element and sealing said intake pressure chamber, said first and second elements having surfaces of equal effective area exposed to the intake pressure, whereby said intake pressure exerts no resultant force component on said movable stem, said movable stem having a passageway extending therethrough from the output pressure side of said first movable valve element to said second movable valve element, a third movable valve element biased to close against the second movable valve element whereby the bleeding of pressure fluid from said passageway is regulated, and a second seal between said third movable valve element and the casing.

17. A combined balanced pressure regulator and relief valve comprising, a casing having intake and output ports connected internally by a chamber, a control valve including first and second relatively movable elements, an exhaust valve including first and second relatively movable members, said first element of the control valve being secured within said chamber and dividing it intermediate said ports into an intake chamber and an output chamber, said second element of the control valve being movable toward and away from said first element to control the flow of fluid from the input chamber to the output chamber, a movable valve structure including said second element of the control valve and the first member of the exhaust valve, said movable valve structure including a seal to said casing to close said intake chamber, said movable valve structure having a first surface associated with said second element of the control valve and exposed to the intake pressure to apply a first force to said movable structure, said movable valve structure having associated therewith a second surface of substantially the same effective area as said first surface and exposed to the intake pressure to apply a second force to said movable valve structure substantially equal in magnitude and opposite in direction to said first force, said movable valve structure having a third surface associated with said second control valve element and exposed to the output pressure to apply a third force to the movable valve structure, said movable valve structure having associated therewith a fourth surface and of substantially the same effective value as said third surface and exposed to the output pressure to apply a fourth force to said movable valve structure and substantially equal in magnitude and opposite in direction to the third force, means defining a passage communicating with the output port and extending to said exhaust valve to permit said exhaust valve to regulate the exhausting of fluid pressure from said output port, means including said first and second exhaust valve members defining a movable chamber near one end of said movable valve structure, said first and second exhaust valve members remaining in engagement and said movable chamber moving bodily in synchronism with said movable valve structure when said second element of the control valve moves away from said first element of the control valve, said passage terminating in continuous communication with said movable chamber, a fifth surface associated with said second member of said exhaust valve and exposed to the pressure in said movable chamber to apply a force to said second member in a direction to open said movable chamber by moving said second exhaust valve member away from said first exhaust valve member, that portion of said second exhaust member included in the means defining said movable chamber being said fifth surface, and adjustable means to apply an elastic force to said second member of said exhaust valve to oppose said force tending to open it, thereby to regulate the output pressure in accord with the adjustment thereof independently of fluctuations in the intake pressure.

18. A combined balanced pressure regulator and relief valve comprising, a casing having intake and output ports connected internally by a chamber, a control valve including first and second relatively movable elements, an exhaust valve including first and second relatively movable members, said first element of the control valve being secured within said chamber and dividing it intermediate said ports into an intake chamber and an output chamber, said second element of the control valve being movable toward and away from said first element to control the flow of fluid from the input chamber to the output chamber, a movable valve structure including said second element of the control valve and the first element of the exhaust valve, said movable valve structure including a seal to said casing to close said intake chamber, said movable valve structure having a first surface associated with said second element of the control valve and exposed to the intake pressure to apply a first force to said movable valve structure, said movable valve structure having associated therewith a second surface of the same effective area as said first surface and exposed to the intake pressure to apply a second force to said movable valve structure substantially equal in magnitude and opposite in direction to said first force, said movable valve structure having a third surface associated therewith and exposed to the output pressure to apply a third force to the movable valve structure, said movable valve structure having associated therewith a fourth surface and of the same effective value as said third surface and exposed to the output pressure to apply a fourth force to said movable valve structure and substantially equal in magnitude and opposite in direction to the third force, said movable valve structure having a passage therein communicating with the fluid in said output chamber and communicating with one of said surfaces exposed to the output pressure and conveying said output pressure to said one surface, said exhaust valve communicating with the fluid in said output port to permit said exhaust valve to regulate the exhausting of fluid pressure from said output port, a fifth surface associated with said second member of said exhaust valve and exposed to the output pressure to apply a fifth force to said member in a direction to open said exhaust valve, and elastic means adjustable to apply a sixth force to said second member of said exhaust valve to oppose said fifth force to regulate the output pressure in accord with the adjustment thereof independently of fluctuations in the intake pressure.

19. A combined balanced pressure regulator and relief valve comprising, a casing having intake and output ports connected internally by a chamber, a control valve including first and second relatively movable elements, an exhaust valve including first and second relatively movable members, said first element of the control valve being secured within said chamber and dividing it between said ports into an intake chamber and an output chamber, said second element of the control valve being movable toward and away from said first element to control the flow of fluid from the intake chamber to the output chamber, a movable valve structure including said second element of the control valve and the first member of the exhaust valve, said movable valve structure including a seal to said casing to close said intake chamber, a baffle affixed to said casing in said intake chamber and having an opening through which said movable valve structure extends, said baffle being closely spaced around said movable valve structure, the space between said baffle and valve structure forming a restricted opening intermediate said second element of the control valve and said seal, first elastic means biasing said movable valve structure toward closure of said control valve, said movable valve structure having a first surface associated with said second element of the control valve and exposed to the intake pressure to apply a first force to said movable valve structure, said movable valve structure having operatively associated therewith a second surface of substantially the same effective area as said first surface and exposed to the intake pressure to apply a second force to said movable valve structure substantially equal in magnitude and opposite in direction to said first force, said movable valve structure having a third surface associated with said second control valve element and exposed to the output pressure to apply a third force to the movable valve structure, said movable valve structure having operatively associated therewith a fourth surface and of substantially the same effective value as said third surface and exposed to the output pressure to apply a fourth force to said movable valve structure and substantially equal in magnitude and opposite in direction to the third force, means defining a passage communicating with the output port and communicating with said exhaust valve to permit said exhaust valve to regulate the exhausting of fluid pressure from said output port, means including said first and second exhaust valve members defining a movable chamber near one end of said movable valve structure, said first and second exhaust valve members remaining in engagement with each other and said movable chamber moving as a unit together with said movable valve structure when said second element of the control valve moves away from said first element of the control valve, said passage terminating in continuous communication with said movable chamber, a fifth surface associated with said second member of said exhaust valve and exposed to the pressure in said movable chamber to apply a fifth force to said member in a direction to open said movable chamber by moving said second exhaust valve member away from said first exhaust valve member, that portion of said second exhaust member included in the means defining said movable chamber being said fifth surface, and second means adjustable to apply an elastic force to said second member of said exhaust valve to oppose said fifth force to regulate the output pressure in accord with the adjustment of said elastic force independently of fluctuations in the intake pressure.

20. A combined balanced pressure regulator and relief valve comprising, a casing having intake and output ports connected internally by a chamber, a control valve including first and second relatively movable elements, an exhaust valve including first and second relatively movable members, said first element of the control valve being secured within said chamber and dividing it between said ports into an intake chamber and an output chamber, said second element of the control valve being movable toward and away from said first element to control the flow of fluid from the intake chamber to the output chamber, a movable valve structure including said second element of the control valve and the first member of the exhaust valve, said movable valve structure including a seal to said casing to close said intake chamber, a baffle affixed to said casing and having an opening through which said movable valve structure extends, said baffle being closely spaced around said movable valve structure, the space between said baffle and valve structure forming a restricted opening, said baffle dividing said intake chamber into two portions and restricting the flow of fluid between said portions, first elastic means biasing said movable valve structure toward closure of said control valve, said movable valve structure having a first surface exposed to the intake pressure to apply a first force to said movable valve structure, said movable valve structure having operatively associated therewith a second surface of the same effective area as said first surface and exposed to the intake pressure to apply a second force to said movable valve structure substantially equal in magnitude and opposite in direction to said first force, said movable valve structure having operatively associated therewith a third surface and exposed to the output pressure to apply a third force to the movable valve structure, said movable valve structure having a fourth surface and of the same effective value as said third surface and exposed to the output pressure to apply a fourth force to said movable valve structure and substantially equal in magnitude and opposite in direction to the third force, said movable valve structure having a passage therein communicating with the fluid in said output chamber and communicating with one of said surfaces exposed to the output pressure and conveying said output pressure to said one surface, said exhaust valve communicating with the fluid in said output port to permit said exhaust valve to regulate the exhausting of fluid pressure from said output port, a fifth surface associated with said second member of said exhaust valve and exposed to the output pressure to apply a fifth force to said member in a direction to open said exhaust valve, and second elastic means adjustable to apply a sixth force to said second member of said exhaust valve to oppose said fifth force to regulate the output pressure in accord with the adjustment of said elastic means independently of fluctuations in the intake pressure.

21. A pressure regulator and relief valve comprising a casing having intake and output ports, an intake chamber communicating with said intake port and an output chamber communicating with said output port, a first control valve element intermediate said chambers, a movable valve stem structure including a second control valve element co-operating with said first control valve element to control the flow of fluid from the intake to the output chamber, said movable valve stem structure having an axial passage therein communicating with the fluid in said output chamber, said axial passage extending through a portion of said movable valve stem structure including said second control valve element, a convoluted flexible seal secured to said movable valve stem structure and secured with respect to said casing and extending between said movable valve stem structure and said casing and sealing up a portion of said intake chamber, said axial passage extending through the portion of said movable valve stem structure to which said flexible seal is secured, said movable valve stem structure including a first exhaust valve element communicating with the fluid in the output port, a second exhaust valve element co-operating with said first exhaust valve element and regulating the exhausting of fluid from said output port, said movable valve stem structure having a first surface operatively associated therewith and exposed to the intake pressure to apply a first force to said movable valve stem structure, said movable valve stem structure having operatively associated therewith a second surface of the same effective area as said first surface and exposed to the intake pressure to apply a second force to said movable valve stem structure substantially equal in magnitude and opposite in direction to said first force, said movable valve stem structure having a third surface operatively associated therewith and exposed to the output pressure to apply a third force to the movable valve stem structure, said movable valve stem structure having operatively associated therewith a fourth surface of the same effective value as said third surface and exposed to the output pressure to apply a fourth force to said movable valve stem structure substantially equal in magnitude and opposite in direction to said third force, a fifth surface associated with said second exhaust valve element and exposed to the output pressure to apply a fifth force to said second exhaust valve element in a direction tending to open said exhaust valve, and means adjustable to apply a sixth force to said second exhaust valve element to oppose said fifth force to regulate the output pressure in accord with the adjustment thereof independently of fluctuations in the intake pressure.

22. A pressure regulator and relief valve comprising a casing having intake and output ports, an intake chamber communicating with said intake port and an output chamber communicating with said output port, a first control valve element intermediate said chambers, a movable valve stem structure including a second control valve element co-operating with said first control valve element to control the flow of fluid from the intake to the output chamber, said movable valve stem structure having an axial passage therein communicating with the fluid in said output chamber, said axial passage extending through a portion of said movable valve stem structure including said second control valve element, a convoluted flexible seal secured to said movable valve stem structure and secured with respect to said casing and extending between said movable valve stem structure and said casing and sealing up a portion of said intake chamber, said axial passage extending through the portion of said movable valve stem structure to which said flexible seal is secured, said movable valve stem structure including a first exhaust valve element communicating with the fluid in the output port, a second exhaust valve element co-operating with said first exhaust valve element and regulating the exhausting of fluid from said output port, said casing having a third chamber therein, means for admitting control fluid thereinto, a second convoluted flexible seal secured to said second exhaust valve element and secured with respect to said casing, said second seal sealing a portion of said third chamber and having one face exposed to the control fluid therein.

23. A pressure regulator and relief valve as claimed in claim 22 and wherein said casing has an exhaust port therein, the other face of said second seal communicates with said exhaust port, a third convoluted flexible seal spaced from said second seal and secured to one of said exhaust valve elements and secured with respect to said casing and having one face communicating with the exhaust port, said exhaust valve when open exhausting into the space between said second and third seals.

24. A pressure regulator and relief valve comprising a casing having intake and output ports, an intake chamber communicating with said intake port and an output chamber communicating with said output port, a first control valve element intermediate said chambers, a movable valve stem structure including a second control valve element co-operating with said first control valve element to control the flow of fluid from the intake to the output chamber, said movable valve stem structure having an axial passage therein communicating with the fluid in said output chamber, said axial passage extending through a portion of said movable valve stem structure including said second control valve element, a flexible seal secured to said movable valve stem structure and secured with respect to said casing and extending between said movable valve stem structure and said casing and sealing up a portion of said intake chamber, said axial passage extending through the portion of said movable valve stem structure to which said flexible seal is secured, a baffle fixed with respect to said casing and closely surrounding said movable valve stem structure intermediate said control valve element and said flexible seal, said baffle effectively dividing said intake chamber into an upper and lower portion and substantially restricting the flow of fluid therebetween, said axial passage passing through the portion of said movable valve stem structure closely surrounded by said baffle, said movable valve stem structure including a first exhaust valve element communicating with the fluid in the output port, a second exhaust valve element co-operating with said first exhaust valve element and regulating the exhausting of fluid from said output port, said movable valve stem structure having a first surface operatively associated therewith and exposed to the intake pressure to apply a first force to said movable valve stem structure, said movable valve stem structure having operatively associated therewith a second surface of the same effective area as said first surface and exposed to the intake pressure to apply a second force to said movable valve stem structure substantially equal in magnitude and opposite in direction to said first force, said movable valve stem structure having a third surface operatively associated therewith and exposed to the output pressure to apply a third force to the movable valve stem structure, said movable valve stem structure having operatively associated therewith, a fourth surface of the same effective value as said third surface and exposed to the output pressure to apply a fourth force to said movable valve stem structure substantially equal in magnitude and opposite in direction to said third force, a fifth surface associated with said second exhaust valve element and exposed to the output pressure to apply a fifth force to said second exhaust valve element in a direction tending to open said exhaust valve, and means adjustable to apply a sixth force to said second exhaust valve element to oppose said fifth force to regulate the output pressure in accord with the adjustment thereof independently of fluctuations in the intake pressure.

25. A pressure regulator and relief valve comprising a casing having intake and output ports, an intake chamber communicating with said intake port and an output chamber communicating with said output port, a first control valve element intermediate said chambers, a movable valve stem structure including a second control valve element co-operating with said first control valve element to control the flow of fluid from the intake to the output chamber, a first convoluted flexible seal secured to said movable valve stem structure and secured with respect to said casing and extending between said movable valve stem structure and said casing and sealing up a portion of said intake chamber, said movable valve stem structure including a first exhaust valve element communicating with the fluid in the output port, a second exhaust valve element co-operating with said first exhaust valve element to regulate the exhausting of fluid from said output port, said pressure regulator and relief valve having a third chamber therein communicating with the fluid in the output chamber, a second convoluted flexible seal secured to said movable valve stem structure and sealing up a portion of said third chamber and being exposed to the pressure of the fluid in said output chamber, and means biasing said second exhaust valve element toward said first exhaust valve element.

26. A pressure regulator and relief valve as claimed in claim 25 and wherein said pressure regulator and relief valve includes a fourth chamber and said means biasing said second exhaust valve element toward said first exhaust valve element includes a third convoluted flexible seal secured to said second exhaust valve element and secured with respect to the casing and sealing up a portion of said fourth chamber, and a control port communicating with said fourth chamber.

27. A pressure regulator and relief valve comprising a casing having intake and output ports, an intake chamber communicating with said intake port and an output chamber communicating with said output port, a first control valve element intermediate said chambers, a movable valve stem structure including a second control valve element co-operating with said first control valve element to control the flow of fluid from the intake to the output chamber, a first convoluted flexible seal secured to said movable valve stem structure and secured with respect to said casing and extending between said movable valve stem structure and said casing and sealing up a portion of said intake chamber, said movable valve stem structure including a first exhaust valve element forming an exhaust chamber in communication with the fluid in the output port, and a second exhaust valve element closing said exhaust chamber and co-operating with said first exhaust valve element responsive to increase in pressure in the output port to regulate the exhausting of fluid from said exhaust chamber, said pressure regulator and relief valve having a third chamber therein communicating with the fluid in the output chamber, means biasing said second exhaust valve element toward said first exhaust valve element, and a second convoluted flexible seal secured to one of said exhaust valve elements and sealing up a portion of said third chamber and being exposed to the pressure of the fluid in said output chamber and opposing said biasing means.

References Cited in the file of this patent
UNITED STATES PATENTS

| | | |
|---|---|---|
| 880,402 | Reynolds | Feb. 25, 1908 |
| 975,838 | Derby | Nov. 15, 1910 |
| 1,184,940 | Fulton | May 30, 1916 |
| 1,593,648 | Berger | July 27, 1926 |
| 1,903,338 | Horne | Apr. 4, 1933 |
| 2,524,264 | Knox | Oct. 3, 1950 |